(12) United States Patent
Manabe et al.

(10) Patent No.: US 6,500,531 B2
(45) Date of Patent: Dec. 31, 2002

(54) RUBBER REINFORCING CORD AND FIBER REINFORCED RUBBER MATERIAL

(75) Inventors: Takao Manabe, Ehime (JP); Haruhiko Kondo, Ehime (JP); Hajime Kishi, Ehime (JP)

(73) Assignee: Toray Industries, Inc., Tokyo (JP)

( * ) Notice: Subject to any disclaimer, the term of this patent is extended or adjusted under 35 U.S.C. 154(b) by 9 days.

(21) Appl. No.: 09/736,207

(22) Filed: Dec. 15, 2000

(65) Prior Publication Data

US 2001/0004491 A1 Jun. 21, 2001

(30) Foreign Application Priority Data

Dec. 15, 1999 (JP) .............................. 10-355609

(51) Int. Cl.$^7$ .............................. B32B 25/02
(52) U.S. Cl. .................... 428/295.1; 428/367; 428/368; 428/375; 428/378; 428/372; 428/364; 428/408
(58) Field of Search ................. 428/367, 375, 428/378, 372, 392, 364, 368, 408

(56) References Cited

U.S. PATENT DOCUMENTS 4,044,540 A   8/1977   Toki et al.
4,883,712 A * 11/1989  Ogawa et al. ............... 428/367
4,891,267 A *  1/1990  Takahashi et al. .......... 428/367

FOREIGN PATENT DOCUMENTS

| EP | 0 902 046 A2 | 3/1999 |
| GB | 1 486 746 | 9/1977 |
| JP | 60 181369 | 9/1985 |
| JP | 63 006165 | 1/1988 |

* cited by examiner

Primary Examiner—Merrick Dixon
(74) Attorney, Agent, or Firm—Morrison & Foerster LLP

(57) ABSTRACT

The subject of this invention is to provide a rubber reinforcing cord that can be suitably used as a reinforcing material of rubber materials such as tires, belts and hoses and is excellent in fatigue resistance. This invention is a rubber reinforcing cord, characterized in that a carbon fiber bundle having a breaking extension of 1.7% or more is impregnated with a resin composition containing a rubber latex, and that the initial gradient (dM/dy) at y=0 of the bending load M—deflection y curve of the cord is 1000 N/m or less. This invention is a substantially twist-less rubber reinforcing cord, characterized in that a carbon fiber bundle having a breaking extension of 1.7% or more is impregnated with a resin composition containing a rubber latex, and that the number of twist of the cord is 10 per meter or less.

12 Claims, No Drawings

RUBBER REINFORCING CORD AND FIBER REINFORCED RUBBER MATERIAL

TECHNICAL FIELD

This invention relates to a rubber reinforcing cord suitably used as a reinforcing material of various rubber materials such as tires, belt and hoses, and also to a fiber reinforced rubber material reinforced by said rubber reinforcing cord.

BACKGROUND ART

Fiber reinforced rubber materials reinforced by rubber reinforcing cords are widely used as rubber materials such as tires, belts, hoses, etc. In general, in these rubber materials, a matrix containing a rubber is reinforced by a cord obtained by coating a twisted reinforcing fiber bundle with an adhesive to form the surface layer of the bundle.

Carbon fibers have high strength and high elastic modulus and also have excellent heat resistance and water resistance, but are poor in the fatigue resistance against such deformation as elongation and compression deformation and bending deformation. So, it has been considered that a fiber reinforced rubber material reinforced by a rubber reinforcing cord formed by carbon fibers is poor in durability.

As attempts to solve the problem, JP, 60-181369, A discloses a method of depositing a mixture consisting of an epoxy compound and a rubber latex on a carbon fiber bundle, and JP, 63-6165, A discloses a method of depositing a mixture consisting of a phenol derivative and a rubber latex on a carbon fiber bundle.

However, even these methods cannot satisfy the fatigue resistance required for such rubber materials as tires, belts and hoses, and any rubber reinforcing cord formed by carbon fibers having sufficient fatigue resistance has not be obtained yet.

DISCLOSURE OF THE INVENTION

To solve the above problem, this invention has the following constitution: A rubber reinforcing cord, characterized in that a carbon fiber bundle having a breaking extension of 1.7% or more is impregnated with a resin composition containing a rubber latex, and that the initial gradient (dM/dy) at y=0 of the bending load M—deflection y curve of the cord is 1000 N/m or less.

To solve the above problem, this invention also has the following constitution: A substantially twist-less rubber reinforcing cord, characterized in that a carbon fiber bundle having a breaking extension of 1.7% or more is impregnated with a resin composition containing a rubber latex, and that the number of twist of the cord is 10 per meter or less.

THE BEST MODE FOR CARRYING OUT THE INVENTION

The inventors found that a rubber enforcing cord, characterized in that a carbon fiber bundle having a breaking extension of more than a certain value is impregnated with a resin composition containing a rubber latex, and that the initial gradient of the bending load-deflection curve of the cord is less than a certain value or that the number of twist of the cord is less than a certain value can exhibit excellent fatigue resistance unexpectedly, to solve the above problems all at once.

In this invention, it is necessary that the breaking extension of the carbon fiber bundle is 1.7% or more. Preferable is 1.8% or more, and more preferable is 1.9% or more. If the breaking extension is less than 1.7%, the cord is likely to be broken when the rubber material is excessively deformed by an external force, and cannot be used for such applications as tires and belts.

In this invention, it is desirable that the rubber reinforcing cord is 1000 N/m or less or less in the initial gradient of the bending load-deflection curve used as an indicator of flexibility. Preferable is 900 N/m or less, and more preferable is 800 N/m. If the initial gradient is more than 1000 N/m, the cord is low in flexibility, and is likely to have stress concentration caused when the rubber material is repetitively deformed, and is insufficient in fatigue resistance.

In this invention, it is preferable that the rubber reinforcing cord is 10 per meter or less in the number of twist. Preferable are 7 per meter or less, and more preferable are 5 per meter or less. If the number of twist is more than 10 per meter, the abrasion between single fibers is likely to be caused in the cord when the rubber material is repetitively deformed, and the fatigue resistance may become insufficient.

The carbon fiber bundle used in this invention has a tensile strength of 4000 Mpa or more. Preferable is 4400 Mpa or more, and more preferable is 4800 Mpa or more. If the tensile strength is less than 4000 Mpa, the cord is likely to be broken when the rubber material is excessively loaded, and cannot be used for such applications as tires and belts.

It is desirable that the carbon fiber bundle used in this invention has 4000 or 20000 single fibers. A preferable range is 6000 to 18000, and a more preferable range is 8000 to 16000. If the number of single fibers is less than 4000, the reinforcing effect by the cord is insufficient, and the dimensional stability of the rubber material may become insufficient. If more than 20000, it can happen that the cord contains portions not impregnated with the resin composition, and that the rubber material becomes insufficient in fatigue resistance.

It is desirable that the carbon fiber bundle used in this invention is substantially circular in the cross sectional form of each single fiber. If the cross sectional form of each single fiber is not substantially circular and is of any other form such as ellipse, broad bean or three lobes, the abrasion between single fibers makes the cord likely to be broken, and the rubber material may become insufficient in fatigue resistance.

"Being substantially circular" in the above description means that the deformation degree of the section defined by ratio (=R/r) of the radius (R) of the circumscribed circle of the section of the single fiber to the radius (r) of the inscribed circle is in a range of 1 to 1.1.

In this invention, in order to prevent the breaking of the cord or the separation at the cord-rubber interface due to the abrasion between single fibers caused when the rubber material is repetitively deformed, and also in order to improve the fatigue resistance, it is necessary that the carbon fiber bundle is impregnated with a resin composition containing a rubber latex as an essential ingredient.

In general, a rubber latex has a high polymer stably dispersed in water. So, for preventing the voids that impair the fatigue resistance of the cord, it is preferable that the water contained in the cord is removed by heating and drying after the carbon fiber bundle has been impregnated with a resin composition containing a rubber latex.

It is desirable that the resin composition content after drying is 20 to 50 wt % based on 100 wt % of the carbon fiber bundle. A preferable range is 25 to 45 wt %, and a more preferable range is 30 to 40 wt %. If the content is less than 20 wt %, the impregnation of the resin composition into the center portion of the fibre bundle becomes insufficient and the prevention of abrasion between single fibers may become imperfect, and the fatigue resistance of the cord may become insufficient. If more than 50 wt %, the heat resistance, water resistance and solvent resistance of the cord may become insufficient.

In this invention, the elastic modulus of the dried film of the rubber latex at 25° C. (G') should be 0.4 MPa or less, preferably, 0.3 MPa or less, more preferably 0.2 MPa or less. If it is more than 0.4 MPa, the fatigue resistance of the fiber reinforced rubber material becomes insufficient.

Examples of the rubber latex are acrylate-butadiene rubber latexes, acrylonitrile-butadiene rubber latex, isoprene rubber latex, urethane rubber latex, chloroprene rubber latex, styrene-butadiene rubber latex, natural rubber latex, and vinylpyridine-styrene-butadiene rubber latex. Among them, vinylpyridine-styrene-butadiene rubber latex, styrene-butadiene rubber latex and acrylonitrile-butadiene rubber latex are especially effective for improving the fatigue resistance.

It is desirable that the rubber latex (including that of RFL) content is 40 to 80 wt % based on 100 wt % of the resin composition after drying. A preferable range is 45 to 75 wt %, and a more preferable range is 50 to 70 wt %. If the content is less than 40 wt %, the flexibility of the cord may become insufficient, and the fatigue resistance may become insufficient. If the content is more than 80 wt %, the cord may become excessively sticky, and the handling convenience may become insufficient.

In this invention, for improving the fatigue resistance, it is preferable to add an epoxy resin and an RFL adhesive (a mixture consisting of resorcinol-formaldehyde resin and a rubber latex) to the resin composition, together with the rubber latex.

The epoxy resins that can be used here include ethylene glycol diglycidyl ether, glycerol polyglycidyl ether, trimethylolpropane polyglycidyl ether, sorbitol polyglycidyl ether, hexanediol diglycidyl ether, polyethylene glycol diglycidyl ether, polypropylene glycol diglycidyl ether and neopentyl glycol diglycidyl ether. Among them, glycerol polyglycidyl ether, sorbitol polyglycidyl ether and ethylene glycol diglycidyl ether are especially effective for improving the fatigue resistance.

It is desirable that the epoxy resin content is 20 to 80 wt % based on 100 wt % of the resin composition after drying. A preferable range is 30 to 70 wt %, and a more preferable range is 40 to 60 wt %. If the content is less than 20 wt %, the adhesiveness at the cord/rubber interface may become insufficient. If the content is more than 80 wt %, the flexibility of the cord may become insufficient, and the fatigue resistance may become insufficient. An RFL adhesive can be produced, for example, by adding resorcinol and formalin into an aqueous solution containing an alkaline compound such as sodium hydroxide, allowing the mixture to stand at room temperature for several hours, for initially condensing resorcinol and formaldehyde, and adding a latex.

It is desirable that the RFL adhesive content is 10 to 40 wt % based on 100 wt % of the resin composition after drying. A preferable range is 15 to 35 wt %, and a more preferable range is 20 to 30 wt %. If the content is less than 10 wt %, the adhesiveness at the cord/rubber interface may become insufficient. If the content is more than 80 wt %, the flexibility of the cord may become insufficient, and the fatigue resistance may become insufficient.

In the fiber reinforced rubber material of this invention, a matrix containing a rubber is reinforced with said rubber reinforcing cord.

The rubbers that can be contained in the matrix include acrylic rubber, acrylonitrile-butadiene rubber, isoprene rubber, urethane rubber, ethylene-propylene rubber, epichlorohydrin rubber, chlorosulfonated polyethylene rubber, chloroprene rubber, silicone rubber, styrene-butadiene rubber, polysulfide rubber, natural rubber, butadiene rubber, butyl rubber and fluorine rubber.

The matrix can contain, as required, an inorganic filler such as carbon black or silica, organic filler such as chroman resin or phenol resin, and softener such as naphthene oil, in addition to the rubber contained as a main ingredient.

The rubber reinforcing cord of this invention can be produced, for example, as described below. That is, the carbon fiber bundle is passed through a treating solution tank containing a rubber latex and an epoxy resin and then a treating solution tank containing an RFL adhesive, and further through a heating and drying furnace, to remove the water in the cord.

The fiber reinforced rubber material of this invention can be produced, for example, as described below. That is, cords paralleled in the same direction are held on both sides between matrix sheets mainly containing a rubber, and the cord/rubber composite is heated and pressed in a press, to vulcanize the rubber for forming.

The fiber reinforced rubber matrix of this invention can be used for any of tires, belts and hoses, but is especially suitable for tires. In general, a tire consists of a tread portion and side wall portions respectively made of a rubber, and a belt portion, carcass portion and bead portion respectively made from cords and a rubber. The fiber reinforced rubber material of this invention can be used in any of the belt portion, carcass portion and bead portion, but is especially suitable for the belt portion.

The methods for evaluating the carbon fiber bundle and the rubber reinforcing cord of this invention are as follows.

Breaking extension and tensile strength of carbon fiber bundle

Measured according to the methods described in JIS R 7601 (corresponding to ISO 10618). In this case, the carbon fiber bundle was impregnated with a resin of the following composition, and heated for hardening at 130° C. for 35 minutes, to make tensile test pieces.

Resin composition: 3,4-epoxycylohexylmethyl-3,4-epoxy-cyclohexane-carboxylate (100 parts by weight)/ boron trifluoride monoethylamine (3 parts by weight)/ acetone (4 parts by weight)

Sectional form of single fibers of carbon fiber bundle

The carbon fiber bundle was cut in the direction perpendicular to the fiber direction using a razor, and the section of a single fiber was photographed using a scanning electron microscope at 10,000 times at an accelerating voltage of 15 kV. On the sectional photo, a circumscribed circle and an inscribed circle were respectively drawn, and with the radius of the circumscribed circle as R and the radius of the inscribed circle as r, when the sectional deformation degree defined by the ratio (=R/r) was in a range of 1 to 1.1, it was judged that the sectional form of the single fiber was substantially circular.

Elastic modulus of dried film of rubber latex (G')

The rubber latex is dried at 140° C. for 30 minutes and the elastic modulus of the dried film was measured by viscoelasticity tester. Viscoelasticity mesurement system expanded type "ARES" (manufactured by Rhemetric Scientific Co.) was used.

Measuring method: The atmosphere was adjusted to 25° C. and the film was sandwiched by two aluminum circular plates of 16 mm diameter and reciprocally rotated at a cycle of 3.14 rad/sec. The torque loaded to the circular plates was detected and converted to the elastic modulus.

Initial gradient of stress-strain curve of rubber reinforcing cord

Measured according to the method described in ASTM D 885-76. The rubber reinforcing cord was cut at a length of 1 m, and a metallic hook was fastened at one end while a 300 g weight was fastened at the other end. It was suspended in air for 72 hours, to be vertical, for obtaining a sample.

The sample was cut at a length of 2 cm, and the cut piece was placed on a jig at a span of 1 cm. A metallic hook was hooked at the center of the span, and was lowered at a speed of 2 cm/min in an environment of 25° C. and 40% relative humidity, to obtain a bending curve-deflection curve. The gradient of the tangent was extrapolated to load 0 and was defined as the initial gradient of bending load-deflection curve.

Number of twist of rubber reinforcing cord

Measured according to the method described in JIS R 7601 (corresponding to ISO 10618). Both the ends of the cord were set at the clamps of a twist tester at a clamp distance of 500 mm. With one clamp fixed, the other clamp was rotated to count the number of revolutions till the twist was perfectly undone, and the number was doubled to obtain the number of twist (per meter) of the cord.

Fatigue resistance of rubber reinforcing cord

Measured according to the method described in JIS L 1017 (corresponding to ASTM D885-76). A rubber sheet was wound around a drum, and said rubber reinforcing cord was wound around it at intervals of 55 lines/10 cm. Furthermore, another identical rubber sheet was wound around it, and the three-layer rubber sheet/cord/rubber sheet laminate thus obtained was removed from the drum and placed around a mandrel, as a tube.

Furthermore, it was pressed in a press to vulcanize and form the rubber, for obtaining a fiber reinforced rubber material in which the axial direction of the rubber tube agreed with the direction of the cord (27 mm in outer diameter, 13 mm in inner diameter and 24 cm in length).

The fiber reinforced rubber material was bent by 90° at the center, and air with a pressure of 0.3 MPa was fed into the tube, while both the ends of the tube were revolved at a speed of 850 rpm in the same direction in a 25° C. atmosphere. The time taken till the tube was broken was used as the indicator of fatigue resistance. As can be seen from the results shown in Table 5, the rubber reinforcing cords of this invention are excellent in fatigue resistance.

Rubber sheet composition: Isoprene rubber (70 parts by weight)/butadiene rubber (30 parts by weight)/sulfur (2 parts by weight)/zinc oxide (5 parts by weight)/stearic acid (2 parts by weight)/dibenzothiazyl disulfide (1 part by weight)/carbon black (60 parts by weight)

EXAMPLES 1 THROUGH 8 AND COMPARATIVE EXAMPLES 1 THROUGH 8

This invention is described below more particularly.

In the following examples and comparative examples, the following raw materials were used to prepare rubber reinforcing cords and fiber reinforced rubber materials. The resin compositions impregnated into the carbon fiber bundles are shown in Table 1, and the results of evaluating the fatigue resistance of the rubber reinforcing cords are shown in Table 2.

1. Raw materials
(1) Carbon fiber bundles
   (a) "T300B-12K-50B" (trade No., produced by Toray Industries, Inc.), breaking extension 1.5%, tensile strength 3500 Mpa, sectional deformation degree of single fiber 1.25
   (b) "T700S-12K-50C" (trade No., produced by Toray Industries, Inc.), breaking extension 2.1%, tensile strength 4900 Mpa, sectional deformation degree of single fiber 1.05
   (c) "T800H-12K-40B" (trade No., produced by Toray Industries, Inc.), breaking extension 1.9%, tensile strength 5500 Mpa, sectional deformation degree of single fiber 1.37
(2) Rubber latexes
   (a) Vinylpyridine-styrene-butadiene rubber latex: JSR0652 (trade No., produced by JSR K. K.), solid content 40 wt %, elastic modulus of dried film (G') 0.11 MPa (25° C.)
   (b) Styrene-butadiene rubber latex: JSR2108 (trade No., produced by JSR K. K.), solid content 40 wt %, elastic modulus of dried film (G') 0.11 MPa (25° C.)
   (c) Acrylonitrile-butadiene rubber latex: "Nippol" LX513 (registered trade name, produced by Nippon Zeon Co., Ltd.), solid content 45 wt %, elastic modulus of dried film (G') 0.47 MPa (25° C.)
   (d) Butadiene rubber latex: "Nippol" LX111F (registered trade mark, produced by Nippon Zeon Co., Ltd.), solid content 55 wt %, elastic modulus of dried film (G') 0.46 MPa (25° C.)
(3) Epoxy resins
   (a) Ethylene glycol diglycidyl ether: "Epolite" 40E (registered trade mark, produced by Kyoei Kagaku K. K.), epoxy equivalent 130
   (b) Polyethylene glycol diglycidyl ether: "Epolite" 400E (registered trade mark, Kyoei Kagaku K. K.), epoxy equivalent 290

2. Preparation and evaluation

A carbon fiber bundle was carried at a speed of 10 m/min and passed through a treating solution tank containing a rubber latex and an epoxy resin and then a treating solution tank containing an RFL adhesive, and further passed through a heating and drying furnace of 150° C., to remove the water contained in the treating solutions, for obtaining a rubber reinforcing cord. The dried resin was composed as shown in Table 1, and the content was 30 wt % based on 100 wt % of the carbon fiber bundle.

TABLE 1

| | | Resin compositions | | | | | | | | |
|---|---|---|---|---|---|---|---|---|---|---|
| | | Elastic modulus | Composition (parts by weight after drying) | | | | | | | |
| | | (MPa) | 1 | 2 | 3 | 4 | 5 | 6 | 7 | 8 |
| Rubber latex | JSR0652 | 0.11 | 44 | 22 | 22 | 32 | — | — | — | — |
| | JSR2108 | 0.11 | — | 22 | 22 | — | — | — | — | — |
| | LX513 | 0.47 | — | — | — | — | 44 | — | 32 | — |
| | LX111F | 0.46 | — | — | — | — | — | 44 | — | 32 |
| Epoxy resin | 40E | — | 22 | 22 | 44 | 44 | 14 | 14 | 44 | 44 |
| | 400E | — | 22 | 22 | — | — | 30 | 30 | — | — |
| RFL | Resorcinol | — | 10 | 10 | 10 | 20 | 10 | 10 | 20 | 20 |
| | Formaldehyde | — | 2 | 2 | 2 | 4 | 2 | 2 | 4 | 4 |

The initial gradient of load-deflection curve of the rubber reinforcing cord was measured according to the above-described method. In addition, tubular test pieces of the fiber reinforced rubber material were also made according to the above-described method and the durable lives were determined. As shown in Table 2, the fiber reinforcing cord of this invention is excellent in fatigue resistance.

TABLE 2

Fatigue resistance of rubber reinforcing cords

| | Carbon fibers | | Impregnating | Initial | Durable |
|---|---|---|---|---|---|
| | Type | Breaking extension (%) | resin composition | gradient (N/m) | life (min) |
| Example | | | | | |
| 1 | T700S | 2.1 | 1 | 710 | 296 |
| 2 | T700S | 2.1 | 2 | 720 | 274 |
| 3 | T700S | 2.1 | 3 | 850 | 262 |
| 4 | T700S | 2.1 | 4 | 930 | 243 |
| 5 | T800H | 1.9 | 1 | 740 | 236 |
| 6 | T800H | 1.9 | 2 | 750 | 221 |
| 7 | T800H | 1.9 | 3 | 880 | 205 |
| 8 | T800H | 1.9 | 4 | 960 | 197 |
| Comparative Example | | | | | |
| 1 | T700S | 2.1 | 5 | 1890 | 87 |
| 2 | T700S | 2.1 | 6 | 1920 | 69 |
| 3 | T700S | 2.1 | 7 | 2210 | 72 |
| 4 | T700S | 2.1 | 8 | 2250 | 51 |
| 5 | T300B | 1.5 | 1 | 730 | 37 |
| 6 | T300B | 1.5 | 2 | 760 | 32 |
| 7 | T300B | 1.5 | 3 | 870 | 23 |
| 8 | T300B | 1.5 | 4 | 940 | 14 |

EXAMPLES 9 THROUGH 16 AND COMPARATIVE EXAMPLES 9 THROUGH 16

This invention is described below more particularly.

In the examples and comparative examples, the following raw materials were used to prepare rubber reinforcing cords and fiber reinforced rubber materials.

1. Raw materials
(1) Carbon fiber bundles Same as those used in Example 1.
(2) Rubber latexes
   (a) Vinylpyridine-styrene-butadiene rubber latex: "Nippol" 2518FS (registered trade mark, produced by Nippon Zeon Co., Ltd.), solid content 40.5%, elastic modulus of the dried film of the rubber latex (G') 0.11 MPa (25° C.)
   (b) Styrene-butadiene rubber latex: "Nippol" LX110 (registered trade mark, produced by Nippon Zeon Co., Ltd.), solid content 40.5%, elastic modulus of dried film of the rubber latex (G') 0.11 MPa (25° C.)
(3) Epoxy resins
   (a) Glycerol polyglycidyl ether: "Denacole" EX-313 (registered trade mark, produced by Nagase Chemicals Ltd.), epoxy equivalent 141
   (b) Sorbitol polyglycidyl ether: "Denacole" EX-614 (registered trade mark, produced by Nagase Chemicals Ltd.), epoxy equivalent 167

2. Preparation and evaluation

A carbon fiber bundle was carried at a speed of 10 m/min, and passed through a treating solution tank containing a rubber latex/epoxy resin composed as shown in Table 3, and then a treating solution tank containing an RFL adhesive composed as shown in Table 4. Furthermore, it was passed through a 150° C. heating furnace, to remove the water contained in the treating solutions, for obtaining a rubber reinforcing cord. The rubber latex/epoxy resin content and the RFL adhesive content after drying were respectively 20 wt % and 5 wt % based on 100 wt % of the carbon fiber bundle. Furthermore, the bobbin having the cord wound around it was revolved to unwind the cord at a speed of 5 m/min, and twisted by a predetermined number of times.

Tubular test pieces of the fiber reinforced rubber material were made according to the above-described method and the durable lives were determined.

The resin compositions impregnated into the carbon fiber bundles are shown in Tables 3 and 4, and the results of evaluating the fatigue resistance of rubber reinforcing cords are shown in Table 5. As shown in Table 5, the fiber reinforcing cord of this invention is excellent in fatigue resistance.

TABLE 3

Composition of treating solution (30 wt % aqueous solution)

| | Before drying (parts by weight) | After drying (parts by weight) |
|---|---|---|
| Nippol 2518FS | 185.2 | 75.0 |
| Nippol LX110 | 185.2 | 75.0 |
| Denacole EX-313 | 75.0 | 75.0 |
| Denacole EX-614 | 75.0 | 75.0 |
| Water (ion exchange water) | 479.6 | — |
| Total | 1000.0 | 300.0 |

TABLE 4

Composition of treating solution (35 wt % aqueous solution)

| | Before drying (parts by weight) | After drying (parts by weight) |
|---|---|---|
| Resorcinol | 85.0 | 85.0 |
| Formalin | 41.0 | 15.2 |
| Nippol 2518FS | 494.8 | 200.4 |
| Nippol LX110 | 123.5 | 50.0 |
| Water (ion exchange water) | 255.7 | — |
| Total | 1000.0 | 350.6 |

TABLE 5

Fatigue resistance evaluation results of rubber reinforcing cords

| | Carbon fibers | | Number of twist of cord (per meter) | Durable time (min) |
|---|---|---|---|---|
| | Type | Breaking Extension (%) | | |
| Example | | | | |
| 9 | T700S | 2.1 | <1 | 291 |
| 10 | T700S | 2.1 | 3 | 282 |
| 11 | T700S | 2.1 | 5 | 229 |
| 12 | T700S | 2.1 | 7 | 195 |
| 13 | T800H | 1.9 | <1 | 173 |
| 14 | T800H | 1.9 | 3 | 164 |
| 15 | T800H | 1.9 | 5 | 136 |
| 16 | T800H | 1.9 | 7 | 127 |
| Comparative Example | | | | |
| 9 | T300 | 1.5 | <1 | 60 |
| 10 | T300 | 1.5 | 3 | 48 |
| 11 | T300 | 1.5 | 5 | 39 |
| 12 | T300 | 1.5 | 7 | 25 |

TABLE 5-continued

Fatigue resistance evaluation results of rubber reinforcing cords

| | Carbon fibers | | | |
|---|---|---|---|---|
| | Type | Breaking Extension (%) | Number of twist of cord (per meter) | Durable time (min) |
| 13 | T700S | 2.1 | 40 | 83 |
| 14 | T700S | 2.1 | 50 | 72 |
| 15 | T800H | 1.9 | 40 | 66 |
| 16 | T800H | 1.9 | 50 | 59 |

What is claimed is:

1. A rubber reinforcing cord comprising a carbon fiber bundle impregnated with a resin composition comprising a rubber latex, said carbon fiber bundle having a elongation at break of 1.7% or more, wherein the cord has an initial gradient (dM/dy) at y=0 of the bending load M versus deflection y curve, measured according to ASTM D885-76, of 1000 N/m or less, wherein the amount of the resin composition is 20 to 50 wt % based on 100 wt % of the carbon fiber bundle.

2. A rubber reinforcing cord comprising a carbon fiber bundle impregnated with a resin composition comprising a rubber latex, said carbon fiber bundle having a elongation at break of 1.7% or more, wherein the cord has a number of twist, measured according to JIS R7601, of 10 per meter or less, wherein the amount of the resin composition is 20 to 50 wt % based on 100 wt % of the carbon fiber bundle.

3. A rubber reinforcing cord, according to claim 1 or 2, wherein the tensile strength of the carbon fiber bundle is 4000 Mpa or more.

4. A rubber reinforcing cord, according to claim 1 or 2, wherein the number of single fibers of the carbon fiber bundle is 4000 or 20000.

5. A rubber reinforcing cord, according to claim 1 or 2, wherein the sectional form of the single fibers of the carbon fiber bundle is substantially circular.

6. A rubber reinforcing cord, according to claim 1 or 2, wherein the amount of the rubber latex is 40 to 80 wt % based on 100 wt % of the resin composition.

7. A rubber reinforcing cord, according to claim 1 or 2, wherein an elastic modulus of dried film of the rubber latex at 25° C. (G') is 0.4 Mpa or less.

8. A rubber reinforcing cord, according to claim 1 or 2, wherein the rubber latex contains at least one rubber selected from a group consisting of vinylpyridine-styrene-butadiene rubber latex, styrene-butadiene rubber latex and acrylonitrile-butadiene rubber latex.

9. A rubber reinforcing cord, according to claim 1 or 2, wherein the resin composition contains at least one epoxy resin selected from a group consisting of glycerol polyglycidyl ether, sorbitol polyglycidyl ether and ethylene glycol diglycidyl ether.

10. A rubber reinforcing cord, according claim 1 or 2, wherein the resin composition contains an RFL adhesive.

11. A fiber reinforced rubber material, wherein a matrix containing a rubber is reinforced by the rubber reinforcing cord as set forth in claim 1 or 2.

12. A rubber reinforcing cord comprising a carbon fiber bundle with a resin composition comprising a rubber latex, said carbon fiber bundle having a breaking extension of 1.7% or more, wherein a durable life, measured according to JIS L1017, is 100 minutes or more.

* * * * *